(12) United States Patent
Kwon et al.

(10) Patent No.: US 10,553,356 B1
(45) Date of Patent: Feb. 4, 2020

(54) CAPACITOR COMPONENT

(71) Applicant: SAMSUNG ELECTRO-MECHANICS CO., LTD., Suwon-Si, Gyeonggi-do (KR)

(72) Inventors: Hyung Soon Kwon, Suwon-Si (KR); Kyoung Jin Cha, Suwon-Si (KR); Ji Hong Jo, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 16/188,198

(22) Filed: Nov. 12, 2018

(30) Foreign Application Priority Data

Sep. 3, 2018 (KR) .......................... 10-2018-0104705

(51) Int. Cl.
  *H01G 4/012* (2006.01)
  *H01G 4/30* (2006.01)
  *H01G 4/248* (2006.01)
  *H01G 4/008* (2006.01)
  *H01G 4/232* (2006.01)
  *H01G 4/12* (2006.01)

(52) U.S. Cl.
  CPC .......... *H01G 4/012* (2013.01); *H01G 4/0085* (2013.01); *H01G 4/232* (2013.01); *H01G 4/248* (2013.01); *H01G 4/30* (2013.01); *H01G 4/1227* (2013.01)

(58) Field of Classification Search
  CPC ........ H01G 4/012; H01G 4/1227; H01G 4/33; H01G 4/248; H01G 4/0085; H01G 4/232; H01G 4/30

USPC ....................................................... 361/301.4
See application file for complete search history.

(56) References Cited

U.S. PATENT DOCUMENTS

2009/0263647 A1* 10/2009 Gangopadhyay ....... C01B 33/02
  428/335
2015/0348712 A1* 12/2015 Lee .......................... H01G 4/30
  174/260
2016/0284471 A1*  9/2016 Mizuno .................... H01G 4/30

FOREIGN PATENT DOCUMENTS

JP  2012-004236 A   1/2012
JP  2017-011172 A   1/2017

* cited by examiner

*Primary Examiner* — Michael P McFadden
(74) *Attorney, Agent, or Firm* — Morgan, Lewis & Bockius LLP

(57) ABSTRACT

A capacitor component includes a body including dielectric layers and first and second internal electrodes disposed to face each other while having the dielectric layer interposed therebetween; and first and second external electrodes disposed on an external surface of the body and electrically connected to the first and second internal electrodes, respectively. The body includes a capacitance forming portion including the first and second internal electrodes disposed to face each other while having the dielectric layer interposed therebetween and in which capacitance is formed, and cover portions formed on upper and lower surfaces of the capacitance forming portion, and hardness of the cover portions is 9.5 GPa or more and 14 GPa or less.

17 Claims, 8 Drawing Sheets

I - I'

CAPACITOR COMPONENT

CROSS-REFERENCE TO RELATED APPLICATION(S)

This application claims benefit of priority to Korean Patent Application No. 10-2018-0104705 filed on Sep. 3, 2018 in the Korean Intellectual Property Office, the disclosure of which is incorporated herein by reference in its entirety.

TECHNICAL FIELD

The present disclosure relates to a capacitor component.

BACKGROUND

A multilayer ceramic capacitor, a capacitor component, is a chip-type condenser mounted on the printed circuit boards of various electronic products such as an image display apparatus, including a liquid crystal display (LCD), a plasma display panel (PDP), or the like, a computer, a smartphone, a cellular phone, and the like, serving to charge or discharge electricity therein or therefrom.

The multilayer ceramic capacitor may be used as a component of various electronic apparatuses due to advantages thereof, such as a small size, a high capacitance, and ease of mounting. As various electronic devices such as computers, mobile devices, and the like are miniaturized and have a high output, demand for miniaturization and high capacitance of the multilayer ceramic capacitor is increased.

In order to simultaneously achieve miniaturization and high capacitance of the multilayer ceramic capacitor, the number of stacked layers needs to be increased by reducing thicknesses of a dielectric layer and internal electrodes. Currently, the thickness of the dielectric layer has reached about 0.6 µm, and the dielectric layer continues to be thinned.

However, in a case in which the thickness of the dielectric layer is less than 0.6 µm, it is difficult to secure withstand voltage characteristics, and insulation resistance (IR) deterioration defect of the dielectric layer is increased such that quality and yield may be lowered.

In addition, according to the related art, in order to compare withstand voltage characteristics of the multilayer ceramic capacitor, a breaking down voltage (BDV) at which the multilayer ceramic capacitor is broken is measured and determined while sequentially increasing an application voltage. Therefore, it is difficult to easily compare the withstand voltage characteristics of the multilayer ceramic capacitor.

SUMMARY

An aspect of the present disclosure may provide a capacitor component having excellent withstand voltage characteristics. In addition, an aspect of the present disclosure may provide a new parameter capable of predicting withstand voltage characteristics.

According to an aspect of the present disclosure, a capacitor component may include a body including dielectric layers and first and second internal electrodes disposed to face each other while having the dielectric layer interposed therebetween, and including first and second surfaces opposing each other, third and fourth surfaces connected to the first and second surfaces and opposing each other, and fifth and sixth surfaces connected to the first to fourth surfaces and opposing each other; and first and second external electrodes disposed on an external surface of the body and electrically connected to the first and second internal electrodes, respectively. The body may include a capacitance forming portion including the first and second internal electrodes disposed to face each other while having the dielectric layer interposed therebetween and in which capacitance is formed, and cover portions disposed on upper and lower surfaces of the capacitance forming portion, respectively, and hardness of the cover portions may be 9.5 GPa or more and 14 GPa or less.

According to another aspect of the present disclosure, a capacitor component may include a body including dielectric layers and first and second internal electrodes disposed to face each other while having the dielectric layer interposed therebetween, and including first and second surfaces opposing each other, third and fourth surfaces connected to the first and second surfaces and opposing each other, and fifth and sixth surfaces connected to the first to fourth surfaces and opposing each other; and first and second external electrodes disposed on an external surface of the body and electrically connected to the first and second internal electrodes, respectively. The body may include a capacitance forming portion including the first and second internal electrodes disposed to face each other while having the dielectric layer interposed therebetween and in which capacitance is formed, and cover portions disposed on upper and lower surfaces of the capacitance forming portion, each of the cover portions may include a first region adjacent to the internal electrode disposed at the outermost portion among the first and second internal electrodes and a second region adjacent to the external surface of the body, and hardness of the first region may be 9.5 GPa or more and 14 GPa or less.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
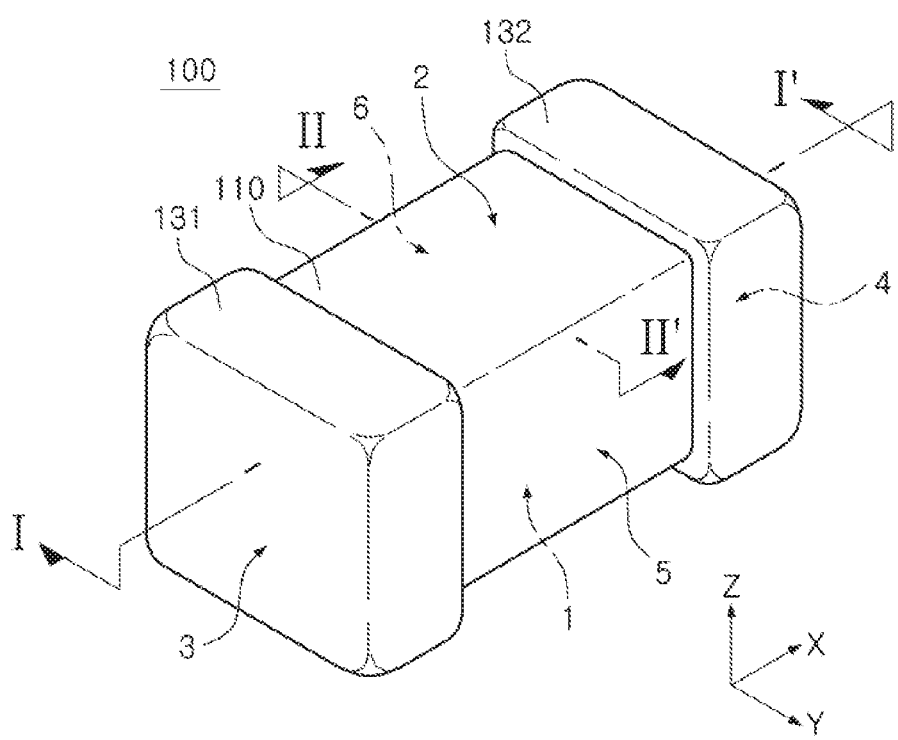
FIG. 1 is a schematic perspective view illustrating a capacitor component according to an exemplary embodiment in the present disclosure.

Hereinafter, exemplary embodiments of the present disclosure will now be described in detail with reference to the accompanying drawings.

In the drawings, an X direction refers to a second direction, an L direction, or a length direction, a Y direction refers to a third direction, a W direction, or a width direction, and a Z direction refers to a first direction, a stacked direction, a T direction, or a thickness direction.

Capacitor Component

FIG. 1 is a schematic perspective view illustrating a capacitor component according to an exemplary embodiment in the present disclosure.

Figure 2:
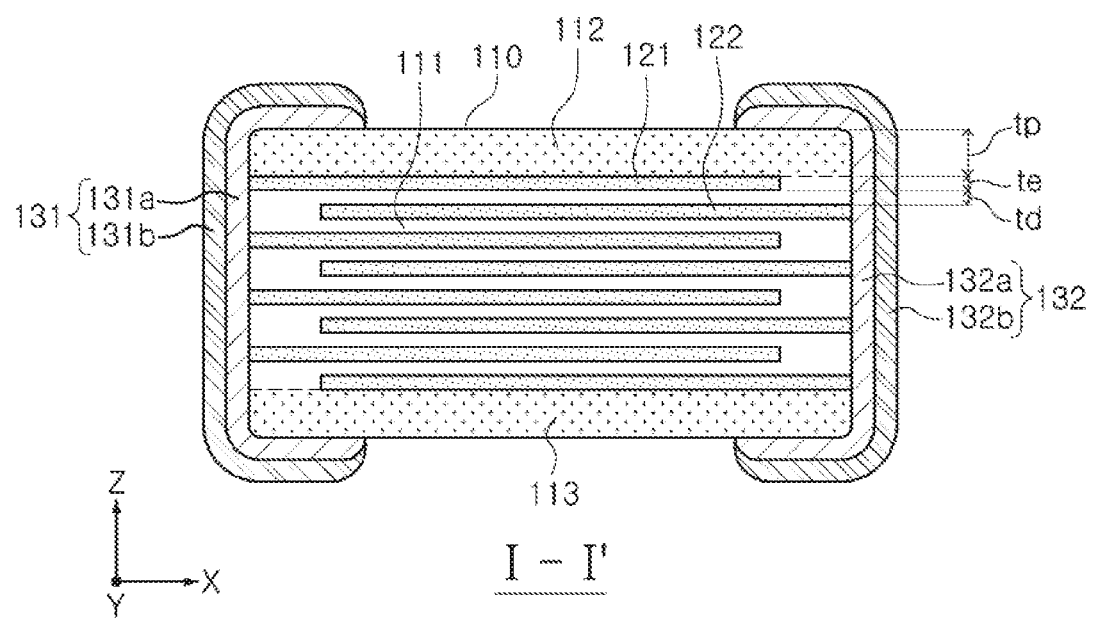
FIG. 2 is a schematic cross-sectional view taken along line I-I' of FIG. 1.

FIG. 2 is a schematic cross-sectional view taken along line I-I' of FIG. 1.

Figure 3:
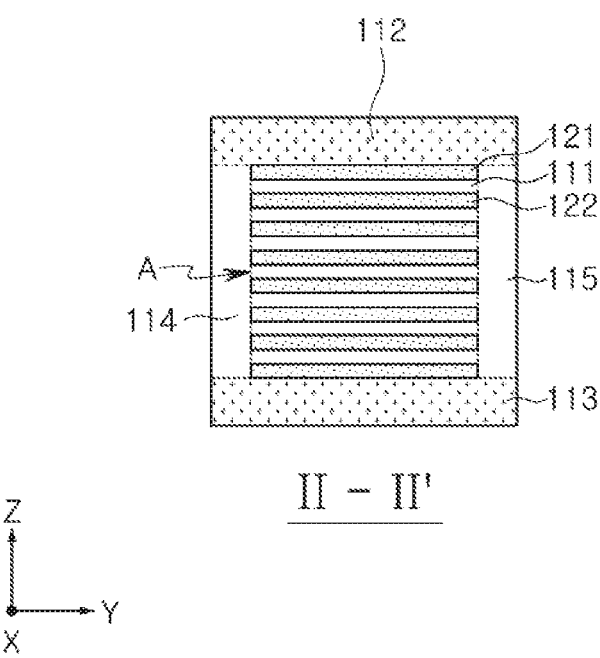
FIG. 3 is a schematic cross-sectional view taken along line II-II' of FIG. 1.

FIG. 3 is a schematic cross-sectional view taken along line II-II' of FIG. 1.

Figure 4A:
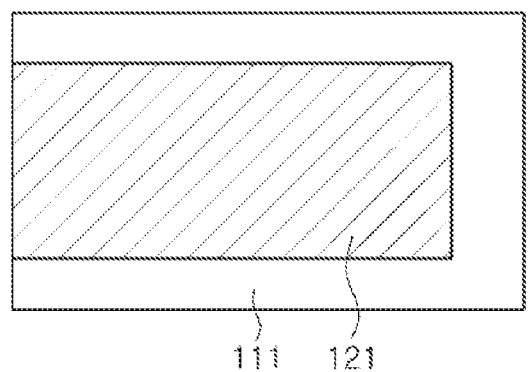
FIGS. 4A and 4B illustrate ceramic green sheets on which internal electrodes for manufacturing a body of the capacitor component according to an exemplary embodiment in the present disclosure are printed.
Figure 4B:
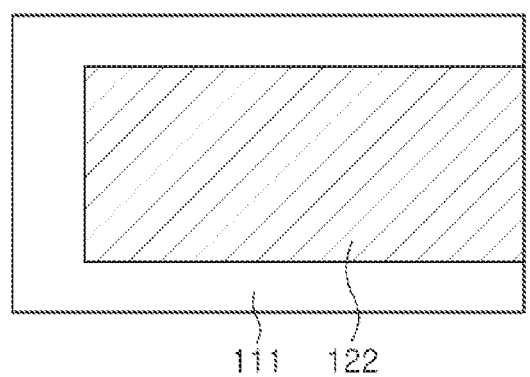

FIGS. 4A and 4B illustrate ceramic green sheets on which internal electrodes for manufacturing a body of the capacitor component according to an exemplary embodiment in the present disclosure are printed.

FIG. 4A illustrates a ceramic green sheet on which a first internal electrode is printed and FIG. 4B illustrates a ceramic green sheet on which a second internal electrode is printed.

Referring to FIGS. 1 through 4B, a capacitor component 100 according to an exemplary embodiment in the present disclosure may include a body 110 including dielectric layers 111 and first and second internal electrodes 121 and 122 disposed to face each other while having the dielectric layer 111 interposed therebetween, and including first and second surfaces 1 and 2 opposing each other, third and fourth surfaces 3 and 4 connected to the first and second surfaces and opposing each other, and fifth and sixth surfaces 5 and 6 connected to the first to fourth surfaces and opposing each other; and first and second external electrodes 131 and 132 disposed on an external surface of the body and electrically connected to the first and second internal electrodes, respectively. The body may include a capacitance forming portion A including the first and second internal electrodes disposed to face each other while having the dielectric layer 111 interposed therebetween and in which capacitance is formed, and cover portions 112 and 113 formed on upper and lower surfaces of the capacitance forming portion, and hardness of the cover portions may be 9.5 GPa or more and 14 GPa or less.

In the body 110, the dielectric layers 111 and the first and second internal electrodes 121 and 122 may be alternately stacked.

A specific shape of the body 110 is not particularly limited, but the body 110 may be formed in a hexahedral shape or a shape similar thereto. Due to the shrinkage of ceramic powders contained in the body 110 during a sintering process, the body 110 may have a substantially hexahedral shape, although it is not a hexahedral shape with a complete straight line.

The body 110 may have the first and second surfaces 1 and 2 opposing each other in a thickness direction (Z direction) thereof, third and fourth surfaces 3 and 4 connected to the first and second surfaces 1 and 2 and opposing each other in a length direction (X direction) thereof, and fifth and sixth surfaces 5 and 6 connected to the first and second surfaces 1 and 2, connected to the third and fourth surfaces 3 and 4, and opposing each other in a width direction (Y direction) thereof.

The plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as it may obtain a sufficient capacitance.

For example, the raw material of the dielectric layer 111 may be barium titanate ($BaTiO_3$) powders. A material of the dielectric layer 111 may be prepared by adding various ceramic additives, organic solvents, plasticizers, binders, dispersing agents, and the like, to the powder such as barium titanate ($BaTiO_3$), or the like, according to an object of the present disclosure.

The internal electrodes 121 and 122 may be stacked alternately with the dielectric layers, and may include the first and second internal electrodes 121 and 122. The first and second internal electrodes 121 and 122 may be alternately disposed to face each other while having the dielectric layers configuring the body 110 interposed therebetween, and may be exposed to the third and fourth surfaces 3 and 4 of the body 110, respectively.

Referring to FIG. 2, the first internal electrode 121 may be spaced apart from the fourth surface 4 of the body 110 and exposed through the third surface 3 of the body 110, and the second external electrode 122 may be spaced apart from the third surface 3 of the body 110 and exposed through the fourth surface 4 of the body 110.

At this time, the first and second internal electrodes 121 and 122 may be electrically insulated from each other by the dielectric layer 111 disposed therebetween. Referring to FIGS. 4A and 4B, the body 110 may be formed by alternatively stacking a ceramic green sheet (a) on which the first internal electrode 121 is printed and a ceramic green sheet (b) on which the second internal electrode 122 is printed and then sintering the ceramic green sheets (a and b).

A material forming each of the first and second internal electrodes 121 and 122 is not particularly limited, but may be a conductive paste formed of one or more of, for example, a noble metal material such as palladium (Pd), a palladium-silver (Pd—Ag) alloy, or the like, nickel (Ni), and copper (Cu).

A method of printing the conductive paste may be a screen printing method, a gravure printing method, or the like, but is not limited thereto.

The capacitor component 100 according to an exemplary embodiment in the present disclosure may include the capacitance forming portion A disposed in the body 110 and forming capacitance by including the first and second internal electrodes 121 and 122 disposed to face each other while having the dielectric layer 111 interposed therebetween, and the cover portions 112 and 113 formed on the upper and lower portions of the capacitance forming portion A.

The capacitance forming portion A, which is a portion contributing to form capacitance of the capacitor, may be formed by repeatedly stacking a plurality of first and second internal electrodes 121 and 122 while having the dielectric layer 111 interposed therebetween.

The upper cover portion 112 and the lower cover portion 113 may not include the internal electrode, and may contain the same material as that of the dielectric layer 111.

That is, the upper cover portion 112 and the lower cover portion 113 may contain a ceramic material, for example, barium titanate ($BaTiO_3$) based ceramic material.

The upper cover portion 112 and the lower cover portion 113 may be formed by stacking a single dielectric layer or two or more dielectric layers on upper and lower surfaces of the capacitance forming portion A, respectively, in a vertical direction, and may basically serve to prevent damage to the internal electrodes due to physical or chemical stress.

In addition, withstand voltage characteristics may be secured by adjusting hardness of the cover portions 112 and 113 to 9.5 GPa or more and 14 GPa or less.

In order to simultaneously achieve miniaturization and high capacitance of the multilayer ceramic capacitor, the number of stacked layers needs to be increased by reducing thicknesses of the dielectric layer and the internal electrodes. Currently, the thickness of the dielectric layer has reached about 0.6 μm, and the dielectric layer continues to be thinned.

However, in a case in which the thickness of the dielectric layer is less than 0.6 μm, it is difficult to secure withstand voltage characteristics, and insulation resistance (IR) deterioration defect of the dielectric layer is increased such that quality and yield may be lowered.

In particular, when a component breakage mode is analyzed, a phenomenon in which breakage occurs in the cover portions 112 and 113 is frequently observed. Therefore, in order to improve the withstand voltage characteristics, it is necessary to control characteristics of the cover portions 112 and 113.

According to an exemplary embodiment in the present disclosure, when the hardness of the cover portions 112 and 113 is controlled to 9.5 GPa or more and 14 GPa or less, a dielectric breakdown may be suppressed to improve the withstand voltage characteristics. In addition, the withstand voltage characteristics may be sufficiently predicted by whether or not the hardness value of the cover portions 112 and 113 satisfies 9.5 GPa or more and 14 GPa or less by measuring only the hardness of the cover portions 112 and 113 of the capacitor component without applying an electric field until the dielectric breakdown.

In a case in which the hardness of the cover portions is less than 9.5 GPa, it is difficult to secure the withstand voltage characteristics, and excessive cost may be consumed or productivity may be lowered to control the hardness of the cover portions to exceed 14 GPa.

Meanwhile, a method for controlling the hardness of the cover portions 112 and 113 is not particularly limited. For example, the hardness of the cover portions 112 and 113 may be controlled by adjusting densification of the cover portions 112 and 113. As the densification of the cover portions 112 and 113 is increased, the hardness of the cover portions 112 and 113 may be increased, and as the densification of the cover portions 112 and 113 is decreased, the hardness of the cover portions 112 and 113 may be decreased.

Figure 5:
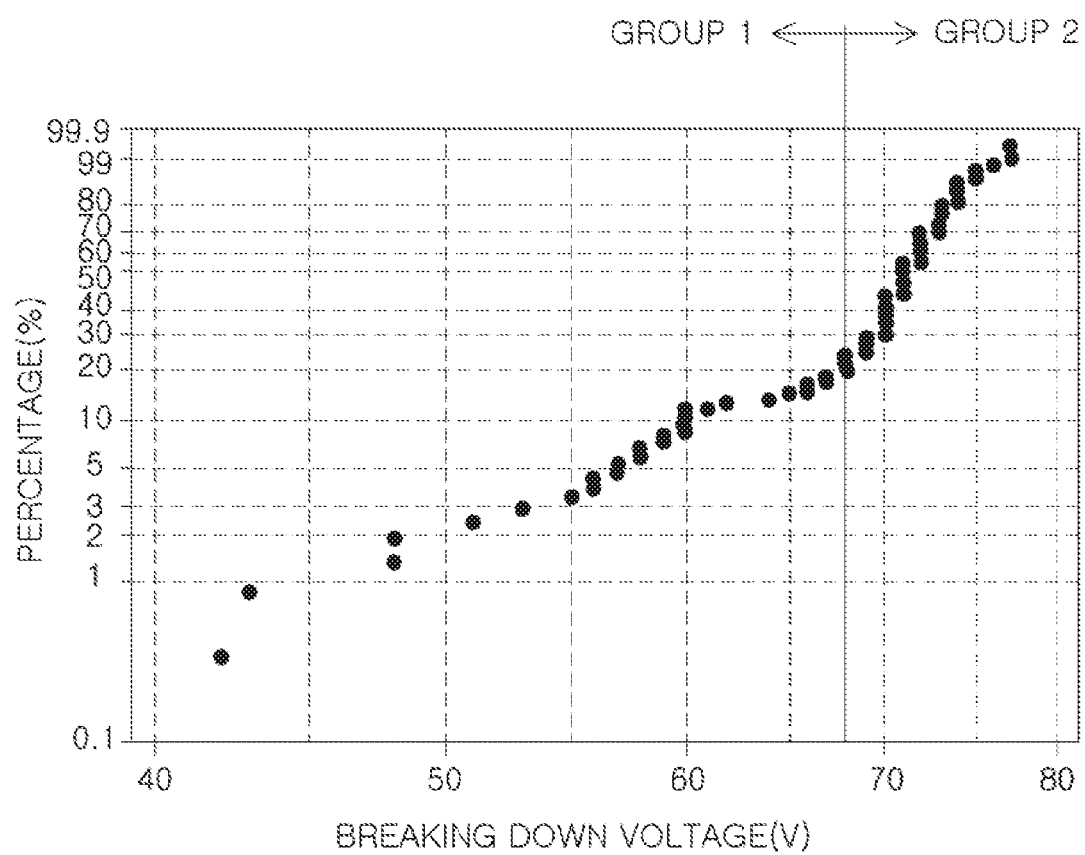
FIG. 5 illustrates the Weibull distribution according to a breaking down voltage for samples having different hardness of a cover portion.
Figure 6:
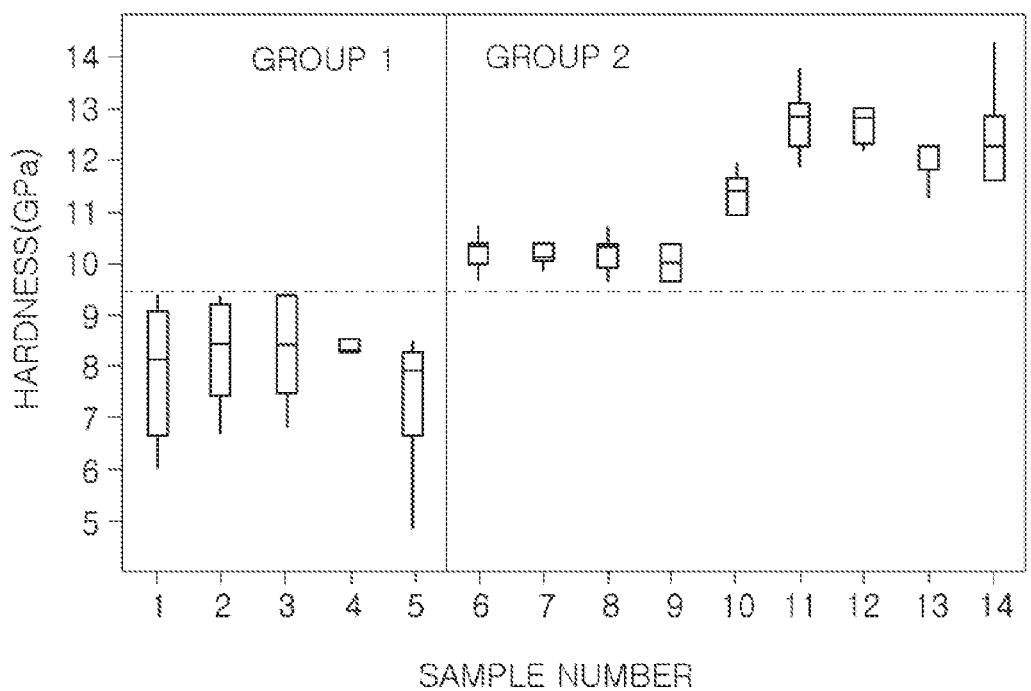
FIG. 6 is a graph illustrating a measurement result of hardness values of a cover portion of samples selected from group 1 and group 2 of FIG. 5.

FIG. 5 illustrates the Weibull distribution according to a breaking down voltage for samples having different hardness of a cover portion. FIG. 6 is a graph illustrating a measurement result of hardness values of a cover portion of samples selected from group 1 and group 2 of FIG. 5.

A voltage value (breaking down voltage (BDV)) at a point of time at which a sample chip is broken is sequentially measured for sixty samples having different hardness and is then shown in the Weibull distribution.

The Weibull distribution is one of the continuous probability distributions and is mainly used for lifetime data analysis. The Weibull distribution is one of probability analyses that may estimate how the probability of failure changes with time, and it follows a probability density function as shown in Equation 1 below.

$$f(t) = \alpha\lambda(\lambda t)^{\alpha-1} e^{-(\lambda t)^\alpha}, t \geq 0$$ [Equation 1]

(α: shape parameter, λ: scale parameter)

At this time, a change in gradient in the Weibull distribution means that the probability density function varies, which means that the causes of lifetime failure vary. Therefore, group 1 and group 2 are classified based on a point at which the gradient is rapidly changed.

Five samples (sample numbers 1 to 5) in group 1 and nine samples (sample numbers 6 to 14) in group 2 are selected, each of the samples is cut as illustrated in FIG. 3, hardness values at five points disposed at equal intervals in the width direction (Y direction) in the upper cover portion 112 and the lower cover portion 113 are measured, and the hardness values at ten points in total are measured for each sample, which are illustrated in FIG. 6.

It may be confirm that the hardness value of the cover portion in the case of group 1 having a low breaking down voltage is less than 9.5 GPa, and the hardness value of the cover portion in the case of group 2 having a high breaking down voltage satisfies 9.5 GPa or more and 14 GPa or less.

In addition, it may be confirmed that the withstand voltage characteristics may be sufficiently predicted even though only the hardness of the cover portions 112 and 113 of the capacitor component are measured without applying the electric field until the dielectric breakdown.

Meanwhile, margin portions 114 and 115 may be disposed on side surfaces of the capacitance forming portion A.

The margin portions 114 and 115 may include a margin portion 114 disposed on the sixth surface 6 of the ceramic body 110 and a margin portion 115 disposed on the fifth surface 5 thereof.

That is, the margin portions 114 and 115 may be disposed on opposite side surfaces of the ceramic body 110 in the width direction thereof.

The margin portions 114 and 115 refer to regions between opposite ends of the first and second internal electrodes 121 and 122 and an interface of the body 110 on a cross section of the body 110 taken along the body 110 in a width-thickness (W-T) direction thereof as illustrated in FIG. 3.

In addition, the cover portions 112 and 113 may have hardness greater than that of the dielectric layer 111 of the capacitance forming portion A.

When a component breakage mode is analyzed, a phenomenon in which breakage occurs in the cover portions 112 and 113 is frequently observed. Therefore, in a case in which the hardness of the cover portions 112 and 113 of 9.5 GPa or more and 14 GPa or less is secured according to the exemplary embodiment in the present disclosure, the withstand voltage characteristics may be secured even though the hardness of the dielectric layer 111 of the capacitance forming portion A is somewhat smaller than that of the cover portions 112 and 113.

Meanwhile, a thickness of each of the first and second internal electrodes is not particularly limited. However, in order to more easily achieve miniaturization and high capacitance of the capacitor component, the thickness to of each of the first and second internal electrodes 121 and 122 may be 0.4 μm or less.

The thickness of each of the first and second internal electrodes 121 and 122 may refer to an average thickness of the first and second internal electrodes 121 and 122.

The average thickness of the first and second internal electrodes 121 and 122 may be measured by scanning an image of a cross section (L-T cross section) of the body 110 in a length and thickness direction thereof using a scanning electron microscope.

For example, with respect to any first and second internal electrodes 121 and 122 extracted from an image obtained by scanning the cross section (L-T cross section) of the body 110 in the length and thickness directions taken along a central portion of the body 110 in the width (W) direction using the scanning electron microscope, thicknesses of the first and second internal electrodes may be measured at thirty points disposed at equal intervals in the length direction to measure an average value thereof.

The thirty points disposed at equal intervals may be measured in a capacitance forming portion that means a region in which the first and second internal electrodes 121 and 122 are overlapped with each other.

In addition, the thickness of the dielectric layer 111 is not particularly limited.

However, in a case in which the dielectric layer has a thin thickness which is less than 0.6 µm, particularly, the thickness of the dielectric layer is 0.4 µm or less, it is difficult to control a process defect that may occur in the cover portions. Therefore, it is difficult to secure the withstand voltage characteristics, and quality and yield may be decreased due to insulation resistance (IR) deterioration defect of the dielectric layer.

According to the exemplary embodiment in the present disclosure as described above, in the case in which the hardness of the cover portions is 9.5 GPa or more and 14 GPa or less, since the withstand voltage characteristics of the capacitor component may be improved and the breakdown voltage (BDV) and reliability may be improved, the withstand voltage characteristics may be sufficiently secured even in a case in which the thickness td of the dielectric layer is 0.4 µm or less.

Therefore, in the case in which the thickness td of the dielectric layer 111 is 0.4 µm or less, an effect of improving the withstand voltage characteristics, the breakdown voltage, and the reliability according to the present disclosure may be more significant.

The thickness td of the dielectric layer 111 may refer to an average thickness of the dielectric layers 111 disposed between the first and second internal electrodes 121 and 122.

The average thickness of the dielectric layer 111 may be measured by scanning an image of a cross section (L-T cross section) of the body 110 in a length and thickness direction thereof using a scanning electron microscope.

For example, with respect to any dielectric layer extracted from an image obtained by scanning the cross section (L-T cross section) of the body 110 in the length and thickness directions taken along a central portion of the body 110 in the width (W) direction using the scanning electron microscope, thicknesses of the dielectric layer may be measured at thirty points disposed at equal intervals in the length direction to measure an average value thereof.

The thirty points disposed at equal intervals may be measured in a capacitance forming portion that means a region in which the first and second internal electrodes 121 and 122 are overlapped with each other.

In addition, the thickness of each of the cover portions 112 and 113 is not particularly limited. However, in order to more easily achieve miniaturization and high capacitance of the capacitor component, the thickness tp of each of the cover portions 112 and 113 may be 20 µm or less. According to the exemplary embodiment in the present disclosure, in a case in which the hardness of the cover portions 112 and 113 is secured to 9.5 GPa or more and 14 GPa or less, the withstand voltage characteristics may be secured even in a case in which the thickness of each of the cover portions 112 and 113 is 20 µm or less.

The external electrodes 131 and 132 may be disposed on the body 110 and may be connected to the internal electrodes 121 and 122. As illustrated in FIG. 2, the external electrodes 131 and 132 may include first and second external electrodes 131 and 132 connected to the first and second internal electrodes 121 and 122, respectively. A structure in which the capacitor component 100 includes two external electrodes 131 and 132 is described in the present exemplary embodiment, but the number, shapes, or the like, of external electrodes 131 and 132 may be changed depending on shapes of the internal electrodes 121 and 122 or other purposes.

Meanwhile, the external electrodes 131 and 132 may be formed of any material as long as it is a material having electrical conductivity such as a metal or the like, and a specific material thereof may be determined in consideration of electrical characteristics, structural stability, and the like. Further, the external electrodes 131 and 132 may have a multilayer structure.

For example, the external electrodes 131 and 132 may include electrode layers 131a and 132a disposed on the body 110 and plating layers 131b and 132b formed on the electrode layers 131a and 132a.

The electrode layers 131a and 132a will be described in more detail. The electrode layers 131a and 132a may be sintered electrodes containing a conductive metal and glass, and the conductive metal may be copper (Cu). In addition, the electrode layers 131a and 132a may be resin-based electrodes containing a plurality of metal particles and a conductive resin.

The plating layers 131b and 132b will be described in more detail. The plating layers 131b and 132b may be a nickel (Ni) plating layer or a tin (Sn) plating layer. The Ni plating layer and the Sn plating layer may be sequentially formed on the electrode layers 131a and 132a. The plating layers 131b and 132b may also include a plurality of Ni plating layers and/or a plurality of Sn plating layers.

Meanwhile, a size of the capacitor component 100 is not particularly limited.

However, in order to simultaneously achieve miniaturization and high capacitance of the capacitor component, it is necessary to increase the number of stacked layers by reducing the thicknesses of the dielectric layer and the internal electrodes. Therefore, the effect of improving withstand voltage characteristics, breakdown voltage (BDV), and reliability according to the present disclosure may be more significant in a capacitor component having a size of 0402 (0.4 mm×0.2 mm) or less.

Therefore, when a distance between the third and fourth surfaces of the body is L and a distance between the fifth and sixth surface thereof is W, L may be 0.4 mm or less and W may be 0.2 mm or less.

That is, the capacitor component according to the present disclosure may be the capacitor component having a size of 0402 (0.4 mm×0.2 mm) or less.

Figure 7:
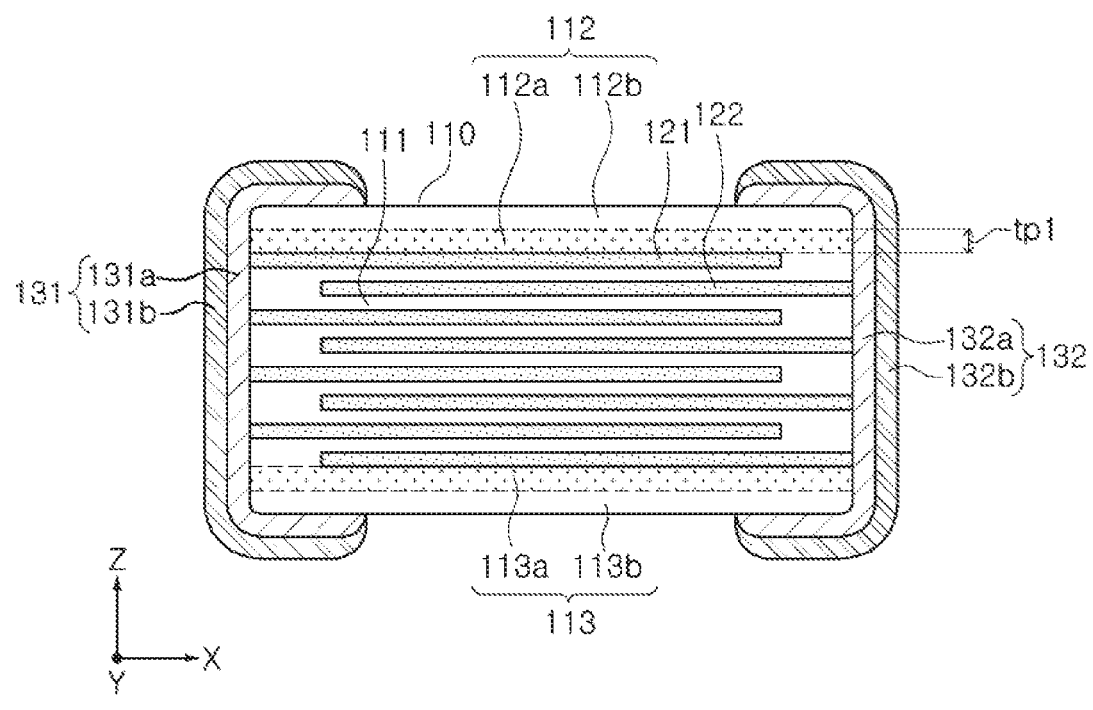
FIG. 7 is a schematic cross-sectional view taken along line I-I' of FIG. 1 according to another exemplary embodiment in the present disclosure.

FIG. 7 is a schematic cross-sectional view taken along line I-I' of FIG. 1 according to another exemplary embodiment in the present disclosure.

Figure 8:
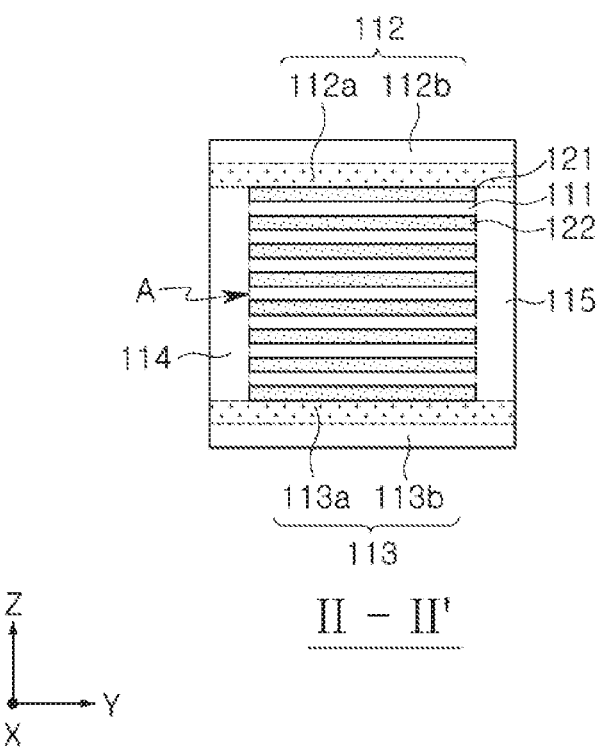
FIG. 8 is a schematic cross-sectional view taken along line II-II' of FIG. 1 according to another exemplary embodiment in the present disclosure.

FIG. 8 is a schematic cross-sectional view taken along line II-II' of FIG. 1 according to another exemplary embodiment in the present disclosure.

Hereinafter, another exemplary embodiment in the present disclosure will be described in detail with reference to FIGS. 7 and 8. However, in order to avoid an overlapped description, the description common to the capacitor component according to an exemplary embodiment in the present disclosure will be omitted.

A capacitor component according to another exemplary embodiment in the present disclosure may include a body 110 including dielectric layers 111 and first and second internal electrodes 121 and 122 disposed to face each other while having the dielectric layer 111 interposed therebetween, and including first and second surfaces 1 and 2 opposing each other, third and fourth surfaces 3 and 4 connected to the first and second surfaces and opposing each other, and fifth and sixth surfaces 5 and 6 connected to the first to fourth surfaces and opposing each other; and first and second external electrodes 131 and 132 disposed on an external surface of the body and electrically connected to the first and second internal electrodes, respectively. The body may include a capacitance forming portion A including the first and second internal electrodes disposed to face each other while having the dielectric layer 111 interposed therebetween and in which capacitance is formed, and cover portions 112 and 113 formed on upper and lower surfaces of the capacitance forming portion, the cover portions 112 and 113 may be divided into first regions 112a and 113a adjacent to the internal electrode disposed at the outermost portion among the first and second internal electrodes and second regions 112b and 113b adjacent to the external surface of the body 110, and hardness of the first regions 112a and 113a may be 9.5 GPa or more and 14 GPa or less.

When a component breakage mode is analyzed, a phenomenon in which breakage occurs in the cover portions 112 and 113 is frequently observed. In particular, the dielectric breakdown mainly occurs in the first regions 112a and 113a adjacent to the internal electrode disposed at the outermost portion among the first and second internal electrodes. Therefore, in order to improve the withstand voltage characteristics, it is necessary to control the hardness of the first regions 112a and 113a to 9.5 GPa or more and 14 GPa or less.

At this time, the first regions 112a and 113a may have the hardness greater than that of the second regions 112b and 113b.

When a component breakage mode is analyzed, a phenomenon in which breakage occurs in the first regions 112a and 113a is frequently observed. Therefore, in a case in which the hardness of the first regions 112a and 113a is secured to 9.5 GPa or more and 14 GPa or less according to another exemplary embodiment in the present disclosure, the withstand voltage characteristics may be secured even though the hardness of the second regions 112b and 113b is somewhat smaller than that of the first regions 112a and 113a.

In addition, the first regions 112a and 113a may have the hardness greater than that of the dielectric layer 111 of the capacitance forming portion A.

When a component breakage mode is analyzed, a phenomenon in which breakage occurs in the first regions 112a and 113a is frequently observed. Therefore, in the case in which the hardness of the first regions 112a and 113a is secured to 9.5 GPa or more and 14 GPa or less according to another exemplary embodiment in the present disclosure, the withstand voltage characteristics may be secured even though the hardness of the dielectric layer 111 of the capacitance forming portion A is somewhat smaller than that of the first regions 112a and 113a.

In addition, a thickness tp1 of each of the first regions 112a and 113a may be 20 µm or less.

In order to more easily achieve miniaturization and high capacitance of the capacitor component, the thickness of each of the first regions 112a and 113a may be 20 µm or less. According to another exemplary embodiment in the present disclosure, in the case in which the hardness of the first regions 112a and 113a is secured to 9.5 GPa or more and 14 GPa or less, the withstand voltage characteristics may be secured even in a case in which the thickness of each of the first regions 112a and 113a is 20 µm or less.

As set forth above, according to the exemplary embodiment in the present disclosure, the capacitor component having the excellent withstand voltage characteristics may be provided.

In addition, the new parameter capable of predicting the withstand voltage characteristics may be provided.

Various advantages and effects of the present disclosure are not limited to the description above, and may be more readily understood in the description of exemplary embodiments in the present disclosure.

While exemplary embodiments have been shown and described above, it will be apparent to those skilled in the art that modifications and variations could be made without departing from the scope of the present invention as defined by the appended claims.

What is claimed is:

1. A capacitor component comprising:
    a body including dielectric layers and first and second internal electrodes disposed to face each other while having the dielectric layers interposed therebetween, and including first and second surfaces opposing each other, third and fourth surfaces connected to the first and second surfaces and opposing each other, and fifth and sixth surfaces connected to the first to fourth surfaces and opposing each other; and
    first and second external electrodes disposed on an external surface of the body and electrically connected to the first and second internal electrodes, respectively,
    wherein the body includes a capacitance forming portion including the first and second internal electrodes disposed to face each other while having the dielectric layers interposed therebetween and in which capacitance is formed, and cover portions disposed on upper and lower surfaces of the capacitance forming portion, respectively,
    the cover portions each have a hardness greater than that of the dielectric layers of the capacitance forming portion, and
    the hardness of the cover portions is 9.5 GPa or more and 14 GPa or less.

2. The capacitor component of claim 1, further comprising margin portions disposed on side surfaces of the capacitance forming, portion.

3. The capacitor component of claim 1, wherein a thickness of each of the dielectric layers is 0.4 µm or less, and
    a thickness of each of the first and second internal electrodes is 0.4 µm or less.

4. The capacitor component of claim 1, wherein a thickness of each of the cover portions is 20 µm or less.

5. The capacitor component of claim 1, wherein a distance between the third and fourth surfaces is 0.4 mm or less, and a distance between the fifth and sixth surfaces is 0.2 mm or less.

6. The capacitor component of claim 5, wherein the third and fourth surfaces oppose each other in a length direction of the body, and
    the first and second external electrodes are disposed the third and fourth surfaces, respectively.

7. A capacitor component comprising:
    a body including dielectric layers and first and second internal electrodes disposed to face each other while having the dielectric layers interposed therebetween, and including first and second surfaces opposing each other, third and fourth surfaces connected to the first and second surfaces and opposing each other, and fifth and sixth surfaces connected to the first to fourth surfaces and opposing each other; and first and second external electrodes disposed on an external surface of the body and electrically connected to the first and second internal electrodes, respectively, wherein the body includes a capacitance forming portion including the first and second internal electrodes disposed to face each other while having the dielectric layers interposed therebetween and in which capacitance is formed, and cover portions disposed on upper and lower surfaces of the capacitance forming portion, respectively, each of the cover portions includes a first region adjacent to the internal electrode disposed at the outermost portion among the first and second internal electrodes and a second region adjacent to the external surface of the body, the first region of each of the cover portions being disposed between the capacitance forming portion and the second region of the cover portions, respectively, each of the first regions has a hardness greater than that of the dielectric layers of the capacitance forming portion, and the hardness of the first regions is 9.5 GPa or more and 14 GPa or less.

8. The capacitor component of claim 7, wherein the first regions of the cover portions have the hardness greater than that of the second regions of the cover portions.

9. The capacitor component of claim 7, further comprising margin portions disposed on side surfaces of the capacitance forming portion.

10. The capacitor component of claim 7, wherein a thickness of the dielectric layers is 0.4 µm or less, and a thickness of each of the first and second internal electrodes is 0.4 µm or less.

11. The capacitor component of claim 7, wherein a thickness of each of the first regions of the cover portions is 20 µm or less.

12. The capacitor component of claim 7, wherein when a distance between the third and fourth surfaces is 0.4 mm or less and a distance between the fifth and sixth surfaces 0.2 mm or less.

13. The capacitor component of claim 12, wherein the third and fourth surfaces oppose each other in a length direction of the body, and the first and second external electrodes are disposed the third and fourth surfaces, respectively.

14. A capacitor component comprising:

a body including dielectric layers and first and second, internal electrodes disposed to face each other while having the dielectric layers interposed therebetween, and including first and second surfaces opposing each other, third and fourth surfaces connected to the first and second surfaces and opposing each other, and fifth and sixth surfaces connected to the first to fourth surfaces and opposing each other; and first and second external electrodes disposed on an external surface of the body and electrically connected to the first and second internal electrodes, respectively, wherein the body includes a capacitance forming portion including the first and second internal electrodes disposed to face each other while having the dielectric layers interposed therebetween and in which capacitance is formed, and cover portions disposed on upper and lower surfaces of the capacitance forming portion, respectively, each of the cover portions includes a first region adjacent to the internal electrode disposed at the outermost portion among the first and second internal electrodes and a second region adjacent to the external surface of the body, the first region of the each of the cover portions being disposed between the capacitance forming portion and the second region of the each of the cover portions, the first regions of the cover portions have a hardness greater than that of the second regions of the cover portions, respectively, the hardness of each of the first regions is 9.5 GPa or more and 14 GPa or less, and the cover portions contain a barium titanate ($BaTiO_3$) based ceramic material.

15. The capacitor component of claim 14, further comprising margin portions disposed on opposing side surfaces of the capacitance forming portion.

16. The capacitor component of claim 14, wherein a thickness of each of the dielectric layers is 0.4 µm or less, and a thickness of each of the first and second internal electrodes is 0.4 µm or less.

17. The capacitor component of claim 14, wherein a thickness of each of the first regions is 20 µm or less.

* * * * *